Oct. 10, 1967 D. F. BROWER 3,345,732
METHOD OF SHRINK FITTING AND APPARATUS THEREFOR
Filed June 11, 1964
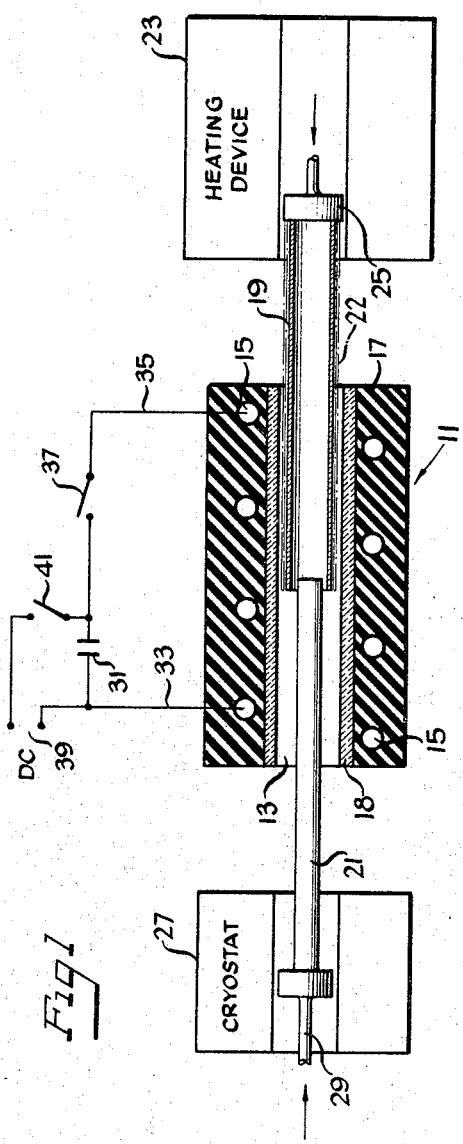
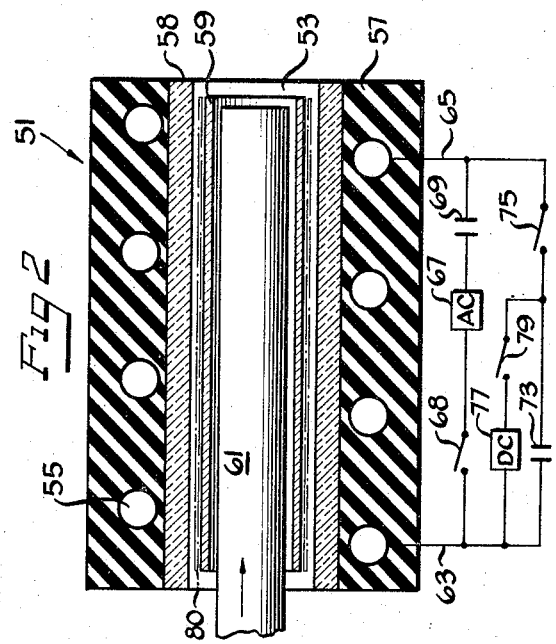
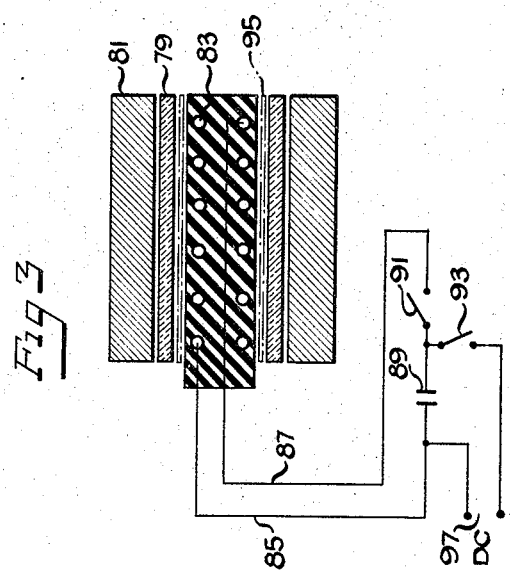
Inventor
David F. Brower
By Anderson, Luedeka, Fitch, Even & Tabin
Atty's 3,345,732
METHOD OF SHRINK FITTING AND APPARATUS THEREFOR
David F. Brower, San Diego, Calif., assignor to General Dynamics Corporation, New York, N.Y., a corporation of Delaware
Filed June 11, 1964, Ser. No. 374,456
15 Claims. (Cl. 29—421)

The present invention relates to a method and apparatus for the joining of members by the utilization of differential thermal compression and/or expansion of the members, the most common application of this technique being the process commonly referred to as shrink fitting, and more particularly, to such a method and apparatus for joining members which also employs the application of a high intensity varying magnetic field.

It has long been common to join an outer member, as for example a sleeve, to an inner member by shrink fitting. In shrink fitting, the outer member is heated, or the inner member is cooled, or both, to the desired degree. The members are then assembled with the inner member residing in a mating opening provided in the outer member, and they are allowed to both return to ambient temperature. Subsequent expansion of the inner member and/or contraction of the outer member provides a good connection between the members.

For two members to be shrink fitted together, there must exist between the members what is termed a negative allowance, or interference, i.e., a portion of one member tends to occupy the same space as the adjacent portion of the mating member. If the inner member has a cylindrical outer surface, the outer diameter of the inner member at ambient temperature must be larger than the inner diameter of the opening in the outer member. Because of the relatively small dimensional change which can be realized as a result of thermal expansion or contraction due to temperature variation of either or both members, a major difficulty is encountered in assembly members relatively long in comparison with their diameters, because the rapid transfer of heat between the closely fitting parts tends to equalize their temperatures, and thus make the spacing between the parts smaller so that the parts bind together before they are suitably positioned. A method for producing shrink fits which avoids the need for close spacing between the members during the positioning operation is needed.

An object of the present invention is the provision of a method and apparatus for forming improved shrink fits. Another object of the invention is the provision of a method for forming shrink fits which does not require close control of machining tolerances of the parts being joined. A further object is the provision of a method for forming tighter connections than normally achieved using usual shrink fitting techniques. A still further object is the provision of a method for shrink fitting parts which, prior to assembly, have spacings in excess of an interference fit at normal temperatures.

FIGURE 1 is a schematic view of a shrink fitting apparatus which may be employed to practice a method in accordance with the present invention, the members to be joined being disposed in a centrally disposed work space;

FIGURE 2 is a schematic view, similar to FIGURE 1, of another embodiment of a shrink fitting apparatus which may be employed to practice a method in accordance with the present invention; and FIGURE 3 is a schematic view of a further embodiment of a shrink fitting apparatus which may be employed to practice a method in accordance with the present invention.

A joining method in accordance with the present invention generally comprises varying the temperature of at least one of two members from the normal environmental temperature of that member to an abnormal temperature, in a direction such that the adjacent surfaces of the two members would move relatively towards each other on return to normal temperature. While one or both members are at the abnormal temperature, a time varying magnetic field of predetermined intensity and shape is established about either of the members so as to interact with an induced current in that member, and thus cause the member in which the current is induced to move rapidly into firm contact with the other member before any appreciable change in temperature occurs in the members.

A method and apparatus for forming materials by employing a magnetic field of high flux density are fully described in U.S. Patent No. 2,976,907, issued Mar. 28, 1961. In the apparatus described therein, a magnetic field of high flux density is set up about a shaped conductor by passing a current pulse of high amperage through the conductor. The high density field induces a current in a metal work piece disposed in the magnetic field. The interaction between the high density magnetic field and the induced current in the work piece produces a resultant impulse on the work piece which, when made great enough, forms the metal work piece.

For purposes of explanation, the joining method is hereinafter described in connection with various apparatus which may be employed. Referring first to FIGURE 1, apparatus is illustrated which includes a device 11 for setting up a varying magnetic field of high intensity in a cylindrical-shaped work space 13, the device 11 includes a coil 15 which surrounds the work space 13 and which is electrically insulated by an annular support member 17 of suitable non-conductive material. The coil 15 is thermally insulated from the work space 13 by an insulating sleeve 18. The functional operation of the coil 15 is hereinafter described.

In the illustrated apparatus, an outer metallic member 19 and an inner member 21 to be joined are fed into the cylindrical work space 13 from opposite ends thereof. In FIGURE 1, the outer metallic member 19 is depicted as a metallic tube or sleeve and the inner member 21 as a solid rod. Although this is one case for which the present invention is particularly suited, it should be understood that the method of the invention is not limited to such a situation. The inner member 21 may also be of hollow cylindrical shape, or of any other suitable shape that mates substantially with the opening in the outer member 19. Of course, the inner member 21 should have sufficient structural strength to resist deformation when the outer member 19 is squeezed onto it. Likewise, the outer member 19 to be joined may be of any suitable shape so long as it includes an opening proportioned to mate with the outer surface of the inner member 21 and is susceptible of deformation by magnetic-forming. The allowance between the members 19 and 21 may be such as to provide a loose fit between the members.

The outer member 19 is preferably made of a material which is both thermally expandable and electrically conductive. However, in the case of an outer member which is electrically non-conductive or a poor electric conductor, an electrically conductive concentric sleeve 22 (shown in dotted outline) may be interposed between the outer member 19 and the insulating sleeve 18 as a driver for compressing the outer member 19. The concentric sleeve or driver 22 can be made of any convenient material. The driver 22, when made of certain materials of sufficiently low melting point, may disintegrate through melting and/or vaporization subsequent to the driving process.

When this is not the case, and it is desired to remove the driver, this removal may be accomplished by any suitable means such as chemical dissolution. In addition, the outer member need not thermally expandable as long as the inner member is capable of thermal contraction.

A heating device 23 is provided to heat the outer member 19 to a temperature sufficient to substantially thermally expand it. To feed the outer member 19 from the heating device 23 into the work space 13, a feeding mechanism 25 is provided which both supports and properly positions the outer member 19. The heating device 23 is of sufficient length so that the whole portion of the outer member 19 which will be shrink fitted onto the inner member 21 is accommodated in the device 23 at the same time. After the outer member 19 has been heated sufficiently to achieve the desired thermal expansion, the feeding mechanism 25 is used to transfer the member 19 to the work space 13. Alternately, a feeding mechanism can be provided that continuously feeds the outer member 19 through the heating device 23, with the rate of advance being controlled so that the desired thermal expansion has taken place when the member 19 leaves the heating device 23 and enters the work space 13.

A cooling device 27 is disposed adjacent the other end of the device 11 for cooling the inner member 21 to a temperature sufficient to assure substantial contraction thereof. A feeding mechanism 29 is provided, similar to the feeding mechanism 25, for supporting and positioning the inner member 21. Feeding mechanism 29 is designed to feed the inner member 21 co-axially into the cylindrical work space 13 so that it is positioned within the central opening in the outer member 19.

A time varying magnetic field of predetermined intensity and shape is established by passing a high amperage current pulse through the coil 15. The current pulse is provided by connecting a source of energy 31, such as a capacitor bank or a motor generator, through a pair of conductors 33 and 35 to the coil 15. Suitable switch means 37, such as a thyratron, ignitron, etc., is connected between the coil 15 and the capacitor bank 31.

In the illustrated embodiment, the capacitor bank 31 is charged to a high voltage by a high voltage source of direct current 39. Switch means 41 are provided to selectively permit charging of the capacitor bank 31 and isolation of the D.C. source. Preferably, the energy stored in the source 31 and the resistance and inductance of the coil 15 are such that the magnetic field is set up in a very short period of time, typically less than about 20 microseconds.

In operation of the apparatus, the inner and outer member 21 and 19 are respectively connected to the associated feeding mechanisms 29 and 25. The portions of the inner member 21 and the outer member 19 which are to be joined are positioned within the cooling device 27 and the heating device 23, respectively, which are located adjacent opposite ends of the device 11. After the desired expansion and contraction of the members have taken place, the feeding mechanisms 25 and 29 are activated to rapidly feed the members 19 and 21 co-axially into the cylindrical work space 13. The inner member 21 is positioned within the opening in the outer member 19 to the extent necessary for the desired shrink fit. FIGURE 1 illustrates an intermediate position, as the feeding mechanisms 25 and 29 are transferring the members into the work space 13.

As soon as the members 19 and 21 are assembled as desired and before thermal equalization of the members occurs, the energy source 31, which has been previously charged, is discharged through the coil 15 by closing the switch 37. The pulse provided causes a high intensity field to be set up around the coil 15 throughout the work space 13. This field acts upon the tubular outer member 19, reducing the diameter thereof and sqeezing it onto the outer surface of the inner member 21. Thereafter, the joined members are allowed to return to ambient temperature.

The subsequent expansion of the inner member 21 and the contraction of the outer member 19 increases the tightness of the connection.

As previously stated, although both the cooling device 27 and the heating device 23 may be employed in a single operation, either of them may be used by itself to cause a dimensional change in only one of the members before connection is established. The illustrated method can be performed even when there is a rather wide initial allowance or clearance between the outer member 19 and the inner member 21. This is an important advantage of the method because the outer member may be easily and rapidly fit with ample clearance over the inner member in assembly so that minimum heat transfer results during the assembly process and the requirement of relatively close machining tolerances, heretofore required in shrink fitting, is eliminated. This advantage is particularly important if the members are long in comparison with their diameters.

In FIGURE 2, there is schematically illustrated an alternate embodiment of apparatus for practicing a joining method in accordance with the invention, which apparatus eliminates the need for a separate heating device 23. This apparatus comprises a device 51 which provides a cylindrical work space 53 within a coil 55 that is mounted within a support member 57 made of electrically insulating material. A thermally insulating sleeve 58 is also provided. An outer member 59 to be joined, depicted as a metal sleeve, and an inner member 61, depicted as a metal rod, are shown as the inner member 61 is being inserted into the outer member 59 prior to establishing the connection.

In this embodiment of the apparatus, the outer member 59 is supported co-axially in the work space 53 by suitable support means (not shown) and heated therein until the desired amount of thermal expansion has taken place. Heating of the outer member 59 is accomplished by passing a high frequency alternating current through the coil 55 by coupling the coil, through conductors 63 and 65, to a source 67 of alternating current. A switch 68 is provided in series with the A.C. source 67 to selectively control the passage of high frequency current to the coil 55. An isolating capacitor 69 is also connected in series with the A.C. source 67, for a purpose which will be hereinafter explained. The application of alternating current to the coil 55 establishes an alternating magnetic field in the work space 53, which induces eddy currents in the outer member 59 that heat this member.

To form the outer member 59 onto the inner member 61, electrical components are provided which are similar to those described with reference to the apparatus shown in FIGURE 1. A source of energy 73, such as a capacitor bank, is connected to the coil 55 by suitable connection to the conductors 63 and 65. Suitable switch means 75, such as a thyratron, is provided in series with the capacitor bank 73 and the coil 55. To charge the capacitor bank 73, a high voltage source 77 is connected thereto by a suitable switch 79.

In operation, after the outer member 59 has been heated to a temperature sufficient to accomplish the desired amount of thermal expansion, the switch 68 is opened to remove the alternating current from the coil 55. Prior to or after the heating, the switch 79 is closed to charge the capacitor bank 73 from the D.C. source 77 and then opened. Next, the inner member 61 is positioned co-axially within the bore of the outer member 59 in the position necessary to accomplish the desired shrink fit.

Before any significant thermal contraction of the outer member 59 can take place, the switch means 75 is closed so that a high amperage current pulse flows through the coil 55. The current pulse is prevented from flowing to the alternating current source by the isolating capacitor 69, which is of a capacity such that the high frequency current readily passes therethrough but a large amount of energy from the capacitor bank 73 is prevented from being transmitted therethrough. A high intensity field is thus set up in the work space 53 and acts on the tubular outer member 59, reducing its diameter and squeezing onto the inner member 61. The joined members 59 and 61 are then allowed to return to ambient temperature, whereby contraction of the outer member 59 results in a very tight shrink fit.

It should also be understood that, if desired, suitable cooling means may also be employed with the apparatus shown in FIGURE 2 so as to thermally contract the inner member 61 before it is inserted into the outer member 59. Also, if the outer member 59 is non-conductive or a poor conductor, a conductive driver 80 (shown in dotted outline) can be disposed between the insulating sleeve 58 and the outer member 59.

A further embodiment of the invention is shown in FIGURE 3. In this embodiment, an inner conductive sleeve 79 is expanded against an outer member 81 by means of an inner expansion coil 83. The coil 83 is connected through leads 85 and 87 to a condenser bank 89. A suitable switch 91 is located in the line 87 for completing the circuit. The condenser bank 89 is connected to a source of direct current 97 through switch 93. As in the foregoing embodiments, prior to expanding the inner member 79, the inner member may be cooled or the outer member 81 heated or both the inner member cooled and the outer member heated. If the inner member 79 is non-conductive or a poor conductor, an inner conductive driver 95 (shown in dotted outline) can be interposed between the member 79 and the coil 83.

Various changes and modifications may be made to the above described method and apparatus for shrink fitting without deviating from the spirit and scope of the present invention. For example, one of the members may be made of a material such as a ceramic having a very slight or zero coefficient of thermal expansion in the temperature ranges of interest (i.e., will not expand or contract appreciably upon heating or cooling). In such an instance, the dimension change of the other member will be used to effect desired fit.

Various features of the invention are set forth in the following claims.

What is claimed is:

1. A method of joining members which method comprises providing a first member and a second member loosely fitted within the first member, varying the temperature of at least one of the members from the normal temperature of the members to an abnormal temperature in a direction such that the adjacent surfaces of the two members move relatively towards each other on return to its normal temperature, establishing a time varying magnetic field which interacts with an induced current in either of said members when said one member is at said abnormal temperature causing the member in which the current is induced to move rapidly into firm contact with the other member before any appreciable change in temperature occurs in the members, and returning the members to the normal temperature.

2. A method of joining members which method comprises providing a first member and a second member loosely fitted within the first member and an electrically conductive driver adjacent the second member, varying the temperature of at least one of the members from the normal temperature of the members to an abnormal temperature in a direction such that the adjacent surfaces of the two members move relatively towards each other on return to its normal temperature, establishing a time varying magnetic field which interacts with an induced current in said conductive driver causing the driver to move one of the members into firm contact with the other member before any appreciable change in temperature occurs in the members, and returning the members to the normal temperature.

3. A method of joining members by shrink-fitting which comprises thermally expanding an outer member, providing an inner member loosely fitting within said thermally expanded, heated outer member, establishing a time varying magnetic field of predetermined intensity and shape at the surface of the outer member, said field being sufficient to form the outer member onto the outer surface of the inner member, and cooling the outer member to its normal temperature, whereby a shrink-fit between the members is established.

4. A method of joining members by shrink-fitting which comprises thermally expanding an outer member, providing a loosely fitting inner member within said thermally expanded heated outer member, establishing a time varying magnetic field of predetermined intensity and shape at the inner surface of the inner member, said field being sufficient to form the inner member onto the inner surface of the outer member, and cooling the outer member to its normal temperature, whereby a shrink-fit between the members is established.

5. A method of joining an inner member and an outer member having an opening therein by shrink-fitting, which method comprises thermally expanding an outer member, immediately thereafter disposing an inner member loosely within the opening in the expanded outer member, establishing a time varying magnetic field of predetermined intensity and shape at the surface of the outer member, said field being sufficient to form the outer member onto the outer surface of the inner member, and cooling the outer member to normal temperature, whereby a shrink-fit between the members is established.

6. A method of joining an inner member and a tubular outer metal member having an opening therein by shrink-fitting, which method comprises heating the tubular outer metal member to a temperature sufficient to cause substantial thermal expansion thereof, disposing the inner member within the opening in the tubular outer member, establishing a time varying magnetic field of predetermined intensity and shape at the surface of the metal outer member, said field being sufficient to collapse the walls of the tubular outer member onto the outer surface of the inner member, and cooling the outer member to normal temperature, whereby shrink-fit between the members is established.

7. A method of joining an inner member and an outer member having an opening therein by shrink-fitting, which method comprises thermally contracting an inner member, immediately thereafter disposing the thermally contracted inner member loosely within the opening in the outer member, establishing a time varying magnetic field of predetermined intensity and shape at the surface of the outer member, said field being sufficient to form the outer member onto the outer surface of the inner member, and cooling the outer member to normal temperature, whereby a shrink-fit between the members is established.

8. A method of joining an inner member and an outer metal member having an opening therein by shrink-fitting, which method comprises heating the outer metal member to a temperature sufficient to cause substantial thermal expansion thereof, cooling the inner member to a temperature sufficient to cause substantial thermal contraction thereof, disposing the inner member within the opening in the outer member, establishing a time varying magnetic field of predetermined intensity and shape at the surface of the metal outer member, said field being sufficient to form the outer member onto the outer surface of the inner member, and returning the members to normal temperature, whereby a shrink fit between the members is established.

9. A method of joining an inner member and an outer metal member having an opening therein by shrink-fitting, which method comprises disposing the outer metal member with the turns of an induction coil, heating the outer metal member to a temperature sufficient to cause substantial thermal expansion thereof by passing an alternating current through the induction coil, cooling the inner member to a temperature sufficient to cause substantial thermal contraction thereof, inserting the inner member into the opening in the outer member, passing a high amperage current pulse through the coil to establish a time varying magnetic field of predetermined intensity and shape at the surface of the metal outer member, said field being sufficient to form the outer member onto the outer surface of the inner member, and returning the members to normal temperature, whereby a shrink fit between the members is established.

10. Apparatus for shrink-fitting an outer member having an opening formed therein onto an inner member shaped to fit into the opening in the outer member, which apparatus comprises cooling means, heating means, a conductor shaped to provide a magnetic field of a predetermined shape in a work space, means for feeding the inner member from said cooling means into the work space, means for feeding the outer member from said heating means into the work space, energy storage means, and means for selectively connecting said energy storage means to said shaped conductor, the energy stored in said energy storage means being sufficient to form said outer member onto the mating inner member so that when the members return to normal temperature an excellent shrink fit is established.

11. Apparatus for shrink-fitting an outer member having an opening formed therein onto an inner member shaped to fit into the opening in the outer member which apparatus comprises cooling means, a conductor shaped to provide a magnetic field of a predetermined shape in a work space, means for feeding the inner member from said cooling means into the work space, energy storage means, an alternating current source, means for selectively connecting said alternating current source and said energy storage means to said conductor, the energy stored in said energy storage means being sufficient to form said outer member onto the mating inner member so that when the member returns to normal temperature an excellent shrink fit is established.

12. Apparatus for shrink-fitting an outer member having an opening formed therein onto an inner member shaped to fit into the opening in the outer member, which apparatus comprises heating means, a conductor shaped to provide a magnetic field of a predetermined shape in a work space, means for feeding the outer member from said heating means into the work space, energy storage means and means for selectively connecting said energy storage means to said shaped conductor, the energy stored in said energy storage means being sufficient to form said outer member onto the mating inner member so that when the members return to normal temperature an excellent shrink fit is established.

13. Apparatus for shrink-fitting an outer member having an opening formed therein onto an inner member shaped to fit into the opening in the outer member, which apparatus comprises cooling means, a conductor shaped to provide a magnetic field of a predetermined shape in a work space, means for feeding the inner member from said cooling means into the work space, energy storage means and means for selectively connecting said energy storage means to said shaped conductor, the energy stored in said energy storage means being sufficient to form said outer member onto the mating inner member so that when the members return to normal temperature an excellent shrink fit is established.

14. Apparatus for shrink-fitting an outer member having an opening formed therein onto an inner member shaped to fit into the opening in the outer member, which apparatus comprises means capable of changing the temperature of one of the members, a conductor shaped to provide a magnetic field of a predetermined shape inside the inner member, means for feeding one of the members from said temperature changing means into the work space, energy storage means and means for selectively connecting said energy storage means to said shaped conductor, the energy stored in said energy storage means being sufficient to form said inner member onto the mating outer member so that when the members return to normal temperature an excellent shrink fit is established.

15. Apparatus for shrink-fitting an outer member having an opening formed therein onto an inner member shaped to fit into the opening in the outer member, which apparatus comprises heating means, a conductor shaped to provide a magnetic field of a predetermined shape in a work space, electrically conductive driver means, means for feeding the outer member from said heating means into the work space, energy storage means and means for selectively connecting said energy storage means to said shaped conductor, the energy stored in said energy storage means being sufficient to cause said driver means to form the outer member onto the mating inner member so that when the members return to normal temperature an excellent shrink fit is established.

References Cited

UNITED STATES PATENTS

| | | | |
|---|---|---|---|
| 2,539,057 | 1/1951 | Brown | 29—447 X |
| 2,647,847 | 8/1953 | Black et al. | 29—447 |
| 2,976,907 | 3/1961 | Harvey et al. | 72—56 |

JOHN F. CAMPBELL, *Primary Examiner.*

THOMAS H. EAGER, *Examiner.*